United States Patent
Keiter

(10) Patent No.: US 11,840,211 B2
(45) Date of Patent: Dec. 12, 2023

(54) AUTONOMOUS VEHICLE INTERFACE USING BUS IMPEDANCE TO IDENTIFY CONTROL UNITS, AND ASSOCIATED SYSTEMS AND METHODS

(71) Applicant: REE TECHNOLOGY GMBH, Berlin (DE)

(72) Inventor: Kenneth Simon Keiter, Portland, OR (US)

(73) Assignee: VAY TECHNOLOGY GMBH, Berlin (DE)

( * ) Notice: Subject to any disclaimer, the term of this patent is extended or adjusted under 35 U.S.C. 154(b) by 266 days.

(21) Appl. No.: 17/091,736

(22) Filed: Nov. 6, 2020

(65) Prior Publication Data

US 2021/0139042 A1  May 13, 2021

Related U.S. Application Data

(60) Provisional application No. 62/933,266, filed on Nov. 8, 2019.

(51) Int. Cl.
*H04L 12/40* (2006.01)
*B60W 50/10* (2012.01)
*B60W 50/00* (2006.01)

(52) U.S. Cl.
CPC ....... *B60W 50/10* (2013.01); *H04L 12/40013* (2013.01); *H04L 12/40182* (2013.01);
(Continued)

(58) Field of Classification Search
CPC .......... B60W 50/10; B60W 2050/0047; H04L 12/40013; H04L 12/40182; H04L 2012/40273
(Continued)

(56) References Cited

U.S. PATENT DOCUMENTS 3,675,190 A * 7/1972 Auer, Jr. ................ G01S 7/527
  367/93
4,342,957 A * 8/1982 Russell .............. G01R 1/07314
  324/754.1
(Continued)

FOREIGN PATENT DOCUMENTS

CN    110221179 A  *  9/2019  ......... G01R 31/021
DE    112015006541 T5    2/2018

OTHER PUBLICATIONS

International Search Report and Written Opinion, dated May 12, 2021, corresponding to PCT/IB2020/060494.

*Primary Examiner* — Richard A Goldman
(74) *Attorney, Agent, or Firm* — HOGAN LOVELLS US LLP

(57) ABSTRACT

Systems and methods that facilitate identifying and controlling the systems and subsystems in a vehicle to enable autonomous operation of the vehicle are disclosed. An autonomous vehicle interface (AVI) (the "AVI control system") can interface with and control the system of the vehicle, thereby enabling control of the vehicle as a whole. Electronic control units may be associated with each of the systems and subsystems in the vehicle, and the AVI may interface with and control these electronic control units over a shared data bus. In order to control particular electronic control units, the systems and methods provide for sampling data packets transmitted by the electronic control units on the shared data bus, measuring the impedance of the shared data bus when data packets are being transmitted, and identifying particular electronic control units based on the measured impedance.

7 Claims, 5 Drawing Sheets

(52) U.S. Cl.
CPC ............... *B60W 2050/0047* (2013.01); *H04L 2012/40273* (2013.01)

(58) Field of Classification Search
USPC .......................................................... 701/1
See application file for complete search history.

(56) References Cited

U.S. PATENT DOCUMENTS

| | | | | |
|---|---|---|---|---|
| 5,594,307 | A * | 1/1997 | Adachi | H02P 7/04 |
| | | | | 318/632 |
| 5,792,190 | A * | 8/1998 | Olson | A61N 1/3904 |
| | | | | 607/5 |
| 5,867,089 | A * | 2/1999 | Zyburt | G05D 1/0265 |
| | | | | 701/1 |
| 6,104,182 | A * | 8/2000 | Jurisch | H02J 3/241 |
| | | | | 324/141 |
| 7,259,584 | B1 * | 8/2007 | Day | H04L 25/0278 |
| | | | | 326/26 |
| 7,593,756 | B2 * | 9/2009 | Ferentz | H04L 12/10 |
| | | | | 455/343.1 |
| 7,877,788 | B1 * | 1/2011 | Topp | G06F 21/44 |
| | | | | 726/17 |
| 8,698,449 | B2 * | 4/2014 | Lee | H02J 7/00712 |
| | | | | 320/138 |
| 8,915,428 | B1 * | 12/2014 | Post | G07F 7/088 |
| | | | | 235/382 |
| 8,955,130 | B1 * | 2/2015 | Kalintsev | G06F 21/567 |
| | | | | 710/100 |
| 9,665,151 | B1 * | 5/2017 | Zou | G06F 1/28 |
| 10,114,058 | B2 * | 10/2018 | Sun | B60L 53/14 |
| 11,068,590 | B2 * | 7/2021 | Kamir | G06N 5/04 |
| 11,435,383 | B2 * | 9/2022 | Atobe | G06F 11/07 |
| 11,474,154 | B1 * | 10/2022 | Castelaz | H02J 7/0014 |
| 2002/0194547 | A1 * | 12/2002 | Christensen | H04L 12/423 |
| | | | | 714/E11.026 |
| 2008/0126592 | A1 * | 5/2008 | Townsend | G06F 13/4068 |
| | | | | 710/16 |
| 2008/0258836 | A1 * | 10/2008 | Kim | H03H 7/40 |
| | | | | 333/17.3 |
| 2008/0278257 | A1 * | 11/2008 | Saar | H04N 21/2385 |
| | | | | 333/17.3 |
| 2009/0066438 | A1 * | 3/2009 | Kim | H03H 7/40 |
| | | | | 333/17.3 |
| 2009/0187993 | A1 * | 7/2009 | Lefebvre | G06F 21/123 |
| | | | | 438/106 |
| 2009/0299572 | A1 * | 12/2009 | Fujikawa | G01C 21/26 |
| | | | | 701/36 |
| 2011/0185322 | A1 * | 7/2011 | Young | G01R 31/2853 |
| | | | | 324/762.09 |
| 2012/0014529 | A1 * | 1/2012 | Yamkovoy | H04M 1/6066 |
| | | | | 381/150 |
| 2012/0014531 | A1 * | 1/2012 | Yamkovoy | H04R 5/04 |
| | | | | 381/71.1 |
| 2014/0260546 | A1 * | 9/2014 | Chen | G01N 33/0031 |
| | | | | 73/31.06 |
| 2018/0295011 | A1 * | 10/2018 | Wang | H04L 41/0833 |
| 2019/0028805 | A1 * | 1/2019 | Goto | H04R 29/001 |
| 2019/0058614 | A1 * | 2/2019 | de Haas | H04L 69/18 |
| 2019/0179402 | A1 * | 6/2019 | Wendt | G06F 1/3287 |
| 2019/0186287 | A1 * | 6/2019 | Lowery | H05H 1/46 |
| 2020/0103445 | A1 * | 4/2020 | Medina Garcia | G01R 27/16 |
| 2020/0125527 | A1 * | 4/2020 | Maung | G06F 1/266 |
| 2020/0380131 | A1 * | 12/2020 | Kamir | G06F 21/71 |
| 2021/0120017 | A1 * | 4/2021 | Antonsson | G01R 27/16 |
| 2021/0139042 | A1 * | 5/2021 | Keiter | B60W 50/10 |
| 2021/0377060 | A1 * | 12/2021 | Muth | G06F 13/4072 |
| 2022/0085594 | A1 * | 3/2022 | Pradhan | G01R 19/2513 |
| 2022/0149879 | A1 * | 5/2022 | Iversen | H04B 1/1607 |
| 2023/0223784 | A1 * | 7/2023 | Cronin | H02J 7/345 |
| | | | | 320/167 |

* cited by examiner

AUTONOMOUS VEHICLE INTERFACE USING BUS IMPEDANCE TO IDENTIFY CONTROL UNITS, AND ASSOCIATED SYSTEMS AND METHODS

CROSS REFERENCE TO RELATED APPLICATION

The present application is a non-provisional of and claims priority to U.S. provisional patent application No. 62/933,266, titled "AUTONOMOUS VEHICLE INTERFACE USING BUS IMPEDANCE TO IDENTIFY CONTROL UNITS, AND ASSOCIATED SYSTEMS AND METHODS," filed on Nov. 8, 2019. The disclosure of the above-identified application is hereby incorporated by reference in its entirety.

TECHNICAL FIELD

The present technology is directed to an autonomous vehicle interface using bus impedance to identify control units, and associated systems and methods.

BACKGROUND

Autonomous vehicles are developed to navigate and operate either unmanned or to assist a vehicle operator. When autonomous capabilities are added by a third-party to a mainstream consumer vehicle that was not originally designed to operate autonomously, the third-party may utilize the many different types of sensors, robotics, computer-controlled systems, and other mechanisms ordinarily found on the vehicle in order to effectuate autonomous control. However, automobile companies and other vehicle manufacturers often implement these computer-controlled systems and other mechanisms using proprietary technologies, and may provide only limited documentation or information regarding the operation of those systems. As a result of such limited information, it can be costly, difficult, and time consuming for third-parties to effectively interface with the existing systems found on the vehicle, and add autonomous capabilities to the vehicle.

Figure 1:
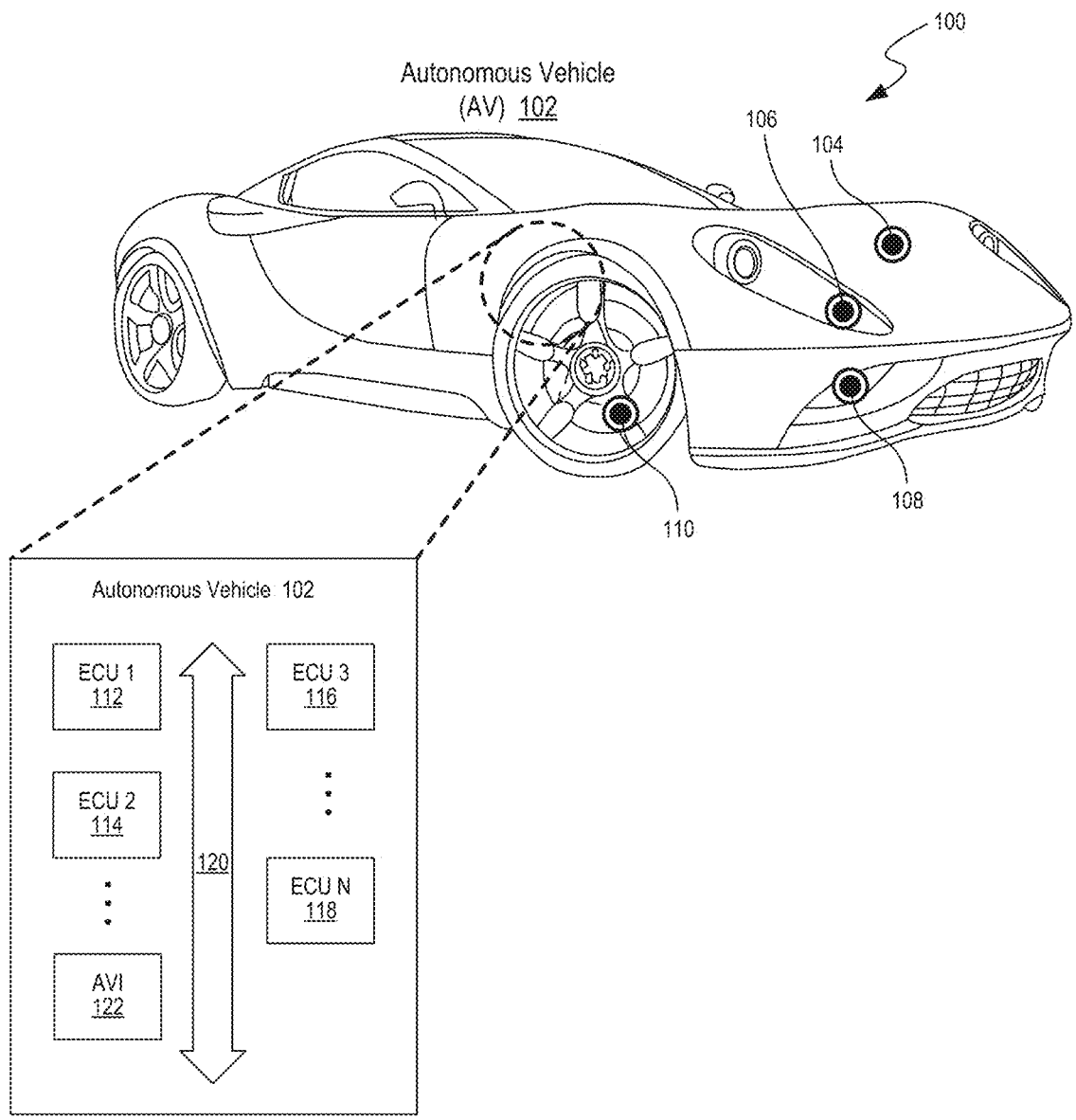
FIG. 1 is a diagram of a representative environment in which a system for identifying and controlling electronic control units (ECUs) of a vehicle with an autonomous vehicle interface (AVI) (the "AVI control system") can operate.

In the present disclosure, the drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in greater detail below. The intention, however, is not to limit the technology to the particular implementations described. On the contrary, the technology is intended to cover all suitable modifications, equivalents, and alternatives.

DETAILED DESCRIPTION

Systems that facilitate identifying and controlling the unique systems and subsystems in a vehicle, thereby enabling autonomous operation of the vehicle, using an autonomous vehicle interface (AVI) (the "AVI control system"), are disclosed herein. The vehicle systems with which the AVI control system interfaces can correspond to different components and aspects of the vehicle. For example, the vehicle can have one vehicle system corresponding to steering, another vehicle system corresponding to acceleration, another vehicle system corresponding to the engine, another vehicle system corresponding to the gear control, etc. By interfacing with and controlling each of these individual vehicle systems, the AVI control system enables control over the vehicle as a whole. The control can include, for example, longitudinal and latitudinal motion control and control of convenience features such as windows, sliding doors, climate controls, an infotainment systems.

Each of the vehicle systems can include a sensor, transducer, and/or other component that detects the physical state of, and/or changes within, the system, as well as an electronic control unit (ECU) that transmits information about the detected state to other systems in the vehicle. For example, in the gear control system of a vehicle, a sensor can generate a signal based on the position of a gear selector lever, which is translated to gear information (e.g., drive, neutral, park, reverse, etc.) by the corresponding ECU. As a further example, in the accelerator system of a vehicle, a sensor can generate a signal based on the extent to which an accelerator pedal has been depressed, which is translated to an acceleration amount by the corresponding ECU. As another example, the sensors may include range or distance finding sensors, such LIDAR, short range radar, long range radar, optical sensors, and lane keeping assist sensors. The ECUs can communicate with each other over a shared data bus, such as a controller area network (CAN) bus, to share information and influence other functions of the vehicle. For example, acceleration data from the acceleration ECU can be received by the ECU for engine control, and thereby control engine operations. Moreover, the information received by the ECU can be used to perform vehicle diagnostics and discern vehicle issues. For example, the ECU may receive vehicle information regarding the failures or faults within one or more vehicle systems, perform diagnostics based on the received information, and determine any vehicle issues such as component failure, necessary maintenance, or system faults. These vehicle issues can be communicated to the AVI, and the AVI can also determine vehicle issues from information provided by the ECUs.

As described herein, the AVI control system can provide information to an end-user regarding which ECU is active at a given time. For example, the AVI control system can include an AVI that is also coupled to the shared communications bus over which the vehicle ECUs communicate (e.g., the CAN bus). The AVI can observe the transmissions from ECUs over the CAN bus, and measure certain bus characteristics (e.g., impedance) to determine when different ECUs are transmitting over the bus. By identifying when one ECU versus another ECU is transmitting over the CAN, the system aids system integrators and/or installers in evaluating which vehicle systems correspond to which ECUs.

The AVI control system also enables downstream user control over the vehicle ECUs, and by extension the corresponding vehicle systems. For example, the AVI control system can include one or more interposers, communicatively coupled to the AVI, that generate synthesized sensor data or synthesized ECU data in place of observed data. As described herein, the synthesized data is consumed by other vehicle systems (e.g., synthesized data from an acceleration ECU is consumed by the engine control ECU), thereby influencing vehicle operations. In other words, the presence of the AVI on the shared CAN bus facilitates communication with, and control over, the vehicle's systems by the AVI control system.

Various implementations of the system will now be described. The following description provides specific details for a thorough understanding and an enabling description of these implementations. One skilled in the art will understand, however, that the system can be practiced without many of these details and/or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

Suitable Environments

FIG. 1 and the following discussion provide a brief, general description of a suitable environment in which a system for vehicle communication and control using an autonomous vehicle interface can be implemented. Although not required, aspects of the system are described in the general context of computer-executable instructions, such as routines executed by a general-purpose computer, a personal computer, a server, and/or other computing system. The system can also be embodied in a special purpose computer or data processor that is specifically programmed, configured, and/or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), field-programmable gate arrays (FPGAs) or the like, and/or any suitable combination of such devices. Computer-executable instructions may be stored in memory, such as random access memory (RAM), read-only memory (ROM), flash memory, or the like, and/or any suitable combination of such components. Computer-executable instructions may also be stored in one or more storage devices, such as magnetic or optical-based disks, flash memory devices, and/or any other suitable type of non-volatile storage medium or non-transitory medium for data. Computer-executable instructions may include one or more program modules, which can include routines, programs, objects, components, data structures, and so on that perform particular tasks and/or implement particular abstract data types.

FIG. 1 illustrates an example environment 100 in which systems in accordance with the present technology operate. Such systems facilitate identifying and controlling the unique systems and subsystems in a vehicle, thereby enabling autonomous operation of the vehicle, using an autonomous vehicle interface. The environment can include an autonomous vehicle 102 which has multiple components, including a first component 104, a second component 106, a third component 108, and so on to an Nth component 110. The various components correspond to different systems of the autonomous vehicle 102. For example, as illustrated, the first component 104 corresponds to the vehicle's engine control system, the second component 106 corresponds to the vehicle's headlights, and the third component 108 corresponds to the vehicle's air intake, etc.

The components of the autonomous vehicle 102 comprise one or more sensors that generate an output based on the physical state of the component (e.g., the amount of air flowing through an intake, the rotation angle of a steering wheel, the distance between the vehicle and other objects, the extent to which a pedal is depressed, etc.), and an electronic control unit (ECU) that interprets the sensor data and controls the component. For example, the autonomous vehicle 102 can include a first ECU 112, a second ECU 114, a third ECU 116, and so on to an $N^{th}$ ECU 118, corresponding to the first-$N^{th}$ components 104, 106, 108, 110. Each ECU can include elements to receive sensor data, interpret the sensor data, and exercise control over the component. Such elements can include a microcontroller, memory storage (e.g., SRAM, EEPROM, or Flash memory), inputs to sample the sensor data, actuator and H bridge drivers, and/or embedded software to control the ECU. The ECUs can also include elements to communicate with each other, such as via point-to-point communications or over a shared bus. For example, the ECUs can communicate with each other, as well as with other components of the autonomous vehicle 102, over a shared CAN bus 120.

The autonomous vehicle 102 can additionally include an AVI 122, which can be coupled to the CAN bus 120. The AVI 122 can include a field-programmable gate array (FPGA) configured to observe and parse information transmitted over the CAN bus 120, generate data for transmittal over the CAN bus, and/or communicate with other components of the system (e.g., ECU interposers and sensor interposers) via the CAN bus and/or other communication channels. The FPGA can also include high-speed I/O logic to enable sampling of data (e.g., data on the CAN bus 120) at a very high rate. The AVI 122 can additionally include an analog-to-digital converter for sampling analog signals over the CAN bus 120 (e.g., voltages across the bus, and/or the impedance of the bus) and generating digital values from the analog signals. The AVI 122 can evaluate the converted digital values (e.g., a voltage and/or impedance value) as part of a logic operation, and can store the converted digital values in memory and/or other storage area of the AVI. The AVI 122 can additionally receive instructions or commands from a downstream user, such as through the CAN bus 120 or through another suitable interface (not shown). The downstream user can issue commands to the AVI 122 to, for example, monitor and record all data transmitted by all or specific ECUs on the CAN bus 120, to control specific systems of the autonomous vehicle 102. That is, as described herein, the AVI can enable both sampling communications from other components of the autonomous vehicle 102 (e.g., over the CAN bus 120), as well as generating synthesized control over autonomous vehicle components.

Identifying Electronic Control Units Over a Bus

Figure 2:
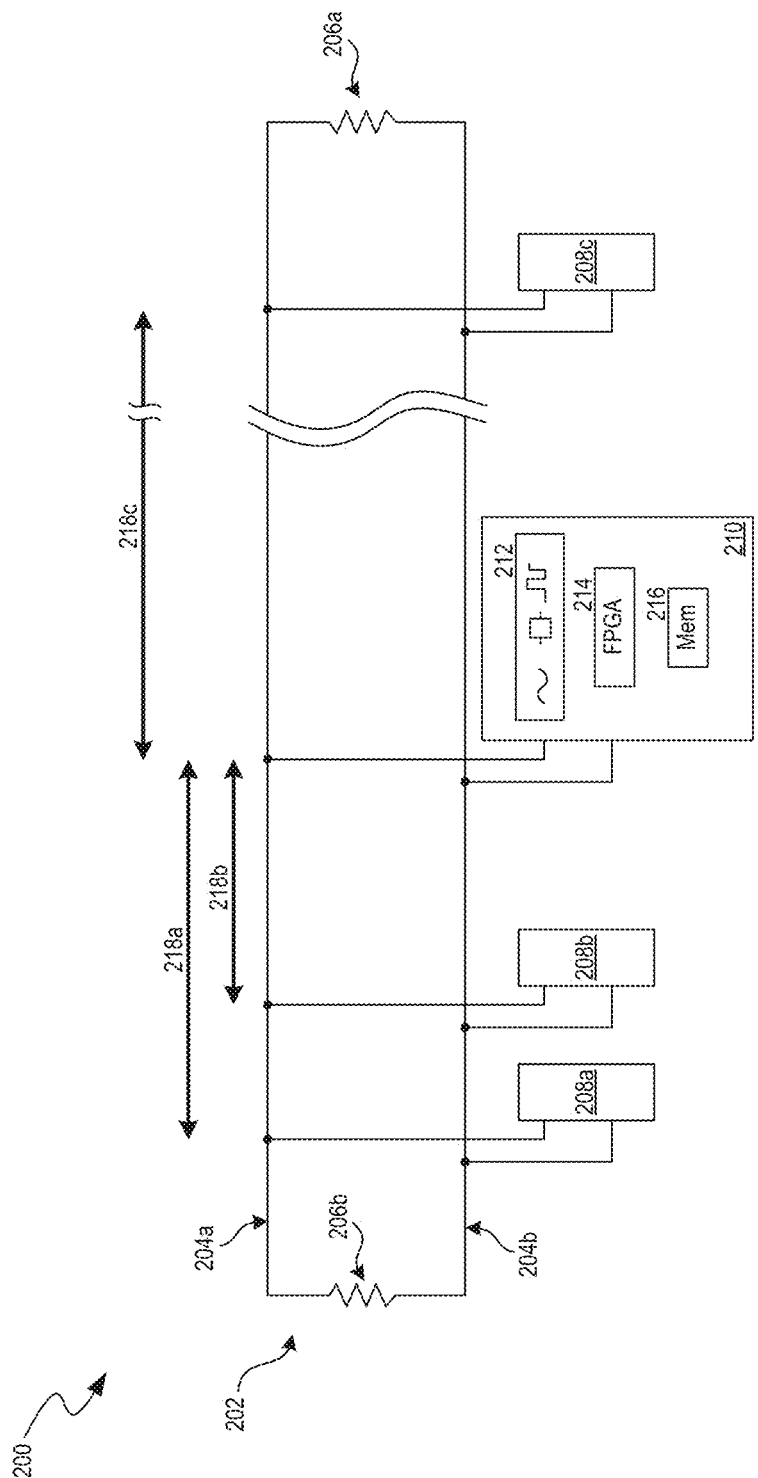
FIG. 2 is a schematic diagram of an embodiment of the AVI control system for identifying ECUs based on the observed impedance over a shared bus, in accordance with representative embodiments of the present technology.

FIG. 2 is a schematic diagram 200 of an embodiment of the present technology, implemented by the AVI control system, for identifying ECUs based on the observed impedance over a shared bus, such as a CAN bus 202. The CAN bus 202, found for example in an autonomous vehicle, can be a linear bus, comprised of two wires 204*a* and 204*b*, terminated at each end with resistors 206*a* and 206*b*. Data can be transmitted serially along the CAN bus 202 (e.g., one bit at a time). ECUs 208*a*, 208*b*, and 208*c*, associated with different components of the autonomous vehicle, are coupled to the CAN bus 202. An AVI 210 can also be coupled to the CAN bus 202. The AVI 210 can include an analog-to-digital converter 212, an FPGA 214, and memory 216.

Due to differences in the internal electrical characteristics of the ECUs, as well as differences in the distances between each of the ECUs and the AVI 210 along the CAN bus 202, the AVI 210 observes different impedances on the CAN bus depending on which ECU is transmitting data at a given time. That is, a first ECU 208*a*, at a first distance 218*a* from the AVI 210 on the CAN bus 202, creates a first impedance (from the perspective of the AVI) when it is transmitting data over the CAN bus. The first impedance differs from a second impedance generated when a second ECU 208*b*, at a second distance 218*b*, transmits data over the CAN bus. Similarly, a third ECU 208*c*, at a third distance 218*c* from the AVI 210 on the CAN bus 202, generates a third impedance that differs from the impedance generated by the other ECUs.

As described herein, the AVI control system samples impedances over the CAN bus 202 and utilizes them to identify which ECU is transmitting at a given time. That is, the AVI control system uses observed impedances as a unique "fingerprint" to determine the source of data on the CAN bus, which is beneficial since, for example, data packets on the CAN bus do not include information indicating the source of the packet. In other words, the AVI control system can detect and/or determine that all data packets associated with a particular impedance originated at one ECU, while all data packets associated with a different impedance originated at a different ECU.

Sampling impedances on the CAN bus 202 at the AVI 210 can be performed using the analog-to-digital converter 212. Sampling using the analog-to-digital converter 212 can further be controlled by the FPGA 214 to, for example, ensure that sampling occurs only when a single ECU is transmitting data over the CAN bus 202. For example, the CAN bus 202 can be a multi-master bus in which multiple ECUs can initiate a transfer over the bus at the same time. When multiple ECUs attempt to transmit data over the CAN bus 202 at the same time, then, during an arbitration phase of the transfer, all ECUs attempting to transfer data over the bus hold off, except the highest priority ECU, where priority is determined by an identifier originating from the ECU. That is, once arbitration has been completed, only a single ECU will drive its data payload onto the CAN bus 202. The FPGA 214 can therefore observe transmissions over the CAN bus 202 to determine which portion of a data packet is currently being transmitted (e.g., the identifier used during arbitration, other header information, data payload, etc.), and identify when the associated data payload is being transmitted. Once the data payload is being transmitted, FPGA 214 can enable the analog-to-digital converter 212 to sample impedance data over the CAN bus 202, since only a single ECU will be transmitting at that time. The AVI control system can then save the converted impedance value to the memory 216.

Figure 3:
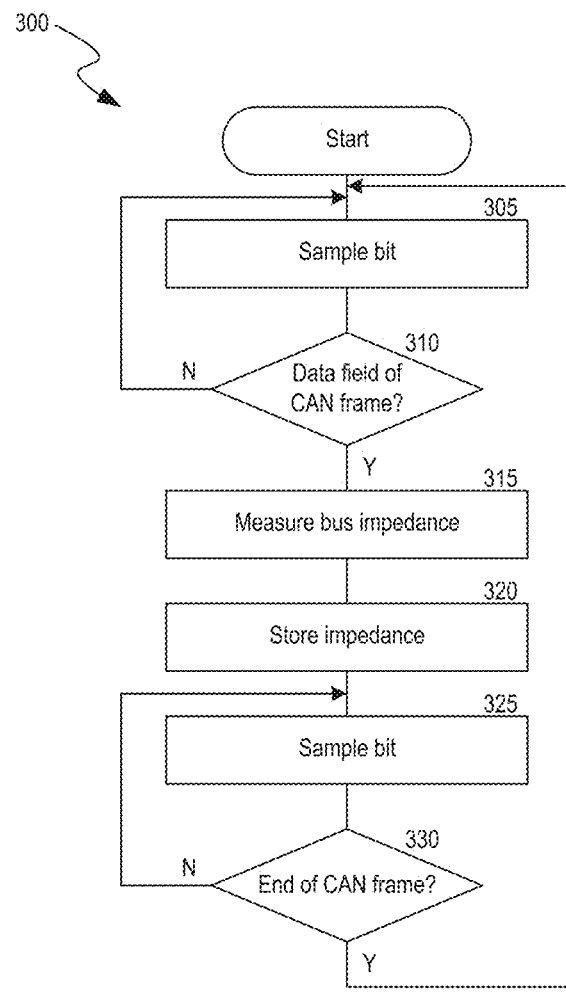
FIG. 3 is a flow chart of a process implemented by an AVI control system for uniquely identifying ECUs based on the observed impedance over a shared bus, in accordance with representative embodiments of the present technology.

FIG. 3 is a flow chart of a process 300 implemented by the AVI control system for uniquely identifying ECUs based on the observed impedance over a shared bus.

The process 300 begins at block 305, where the system samples information on the shared bus. The shared bus can, for example, be a CAN bus, over which information is transferred serially along the bus one or more bits at a time. In some embodiments, the bus is single-bit and asynchronous, with each bit transmitted according to a bit rate that can be fixed or programmed.

At a decision block 310, the system determines whether the sampled information is from the data payload portion of a data packet, such as a CAN frame. That is, a data packet to be transmitted serially over the shared bus can include header information that is transmitted prior to the data payload. For example, a CAN frame includes information such a start-of-frame indicator, an identifier used to arbitrate message priority among multiple messages, frame formatting indicators, data length, etc., that are transferred prior to the CAN frame's data field. The CAN frame also includes information that is transferred after the data payload, such as cyclic redundancy check (CRC) information and an end-of-frame indicator. The system evaluates the information that it has sampled over the bus, for the current packet, to determine whether the currently-sampled information is from the data payload. For example, the system can utilize a state machine that tracks different portions of a CAN frame, from a start-of-frame indicator to an end-of-frame indicator, and recognizes when a data field of the CAN frame is being transmitted over the bus. As described herein, it is advantageous to determine when the data payload is being transmitted over a CAN bus, since that indicates only one actor (e.g., one ECU) is transmitting at that time. If the system determines that the sampled information is not from a data payload, then the process 300 returns to the block 305 to sample the next transmittal over the bus (e.g., the next bit). If the system determines that the sample's information is from a data payload, then the process continues to block 315.

At a block 315, the system measures the impedance of the bus. The system can measure the impedance, for example, with an analog-to-digital converter coupled to the bus. The analog-to-digital converter can be part of, for example, an AVI.

At a block 320, the system stores the measured impedance. The system can store the impedance, for example, in a memory of the AVI. As described herein, the system facilitates the identification of ECUs transmitting over the bus using the measured and stored impedances. For example, in at least some embodiments, the system can store the data payload contents and corresponding impedance of all CAN frames observed over the CAN bus. The association of data payloads and impedances enables a downstream user of the system to identify which data payloads originated from the same source on the bus (i.e., which ECU). Furthermore, the downstream user can analyze the data to determine which specific ECU of an autonomous vehicle corresponds to which impedances and CAN frames. For example, a downstream can determine that a pattern of certain data originating from a first ECU indicates that the ECU is associated with the gear selector of the autonomous vehicle, while a different pattern of data originating from a second ECU indicates that the ECU is associated with the steering control of the autonomous vehicle.

At a block 325, the system samples information on the shared bus. For example, when the shared bus is an asynchronous CAN bus, the system can sample a bit as dictated by the bus bit rate.

At a decision block 330, the system determines whether the sampled information is an end of packet indicator. For example, when the bus is a CAN bus, the system can utilize a state machine that tracks different portions of a CAN frame, from a start-of-frame indicator to the end-of-frame indicator. If the system determines that the sampled information is not an end of packet indicator, then the process 300 returns to the block 325 to sample the next piece of information within the current packet. If the system determines that the sampled information is the end of packet indicator, then the process 300 returns to the block 305 to begin sampling information (and ultimately measuring the impedance) of the next packet (e.g., the next CAN frame).

Controlling Electronic Control Units of a Vehicle

Figure 4:
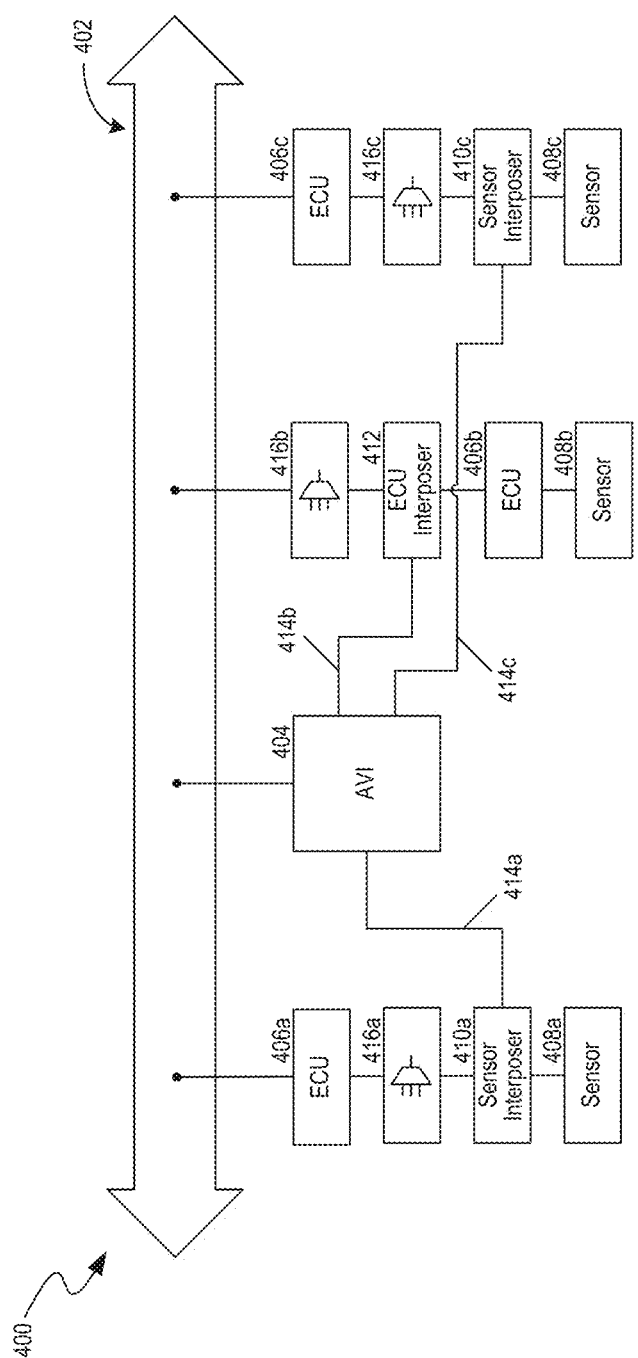
FIG. 4 is a schematic diagram of an embodiment of an AVI control system for controlling ECUs, in accordance with representative embodiments of the present technology.

FIG. 4 is a schematic diagram 400 of a representative embodiment, implemented by the AVI control system, for controlling ECUs in a vehicle. As described herein, the vehicle can include multiple ECUs 406a, 406b, and 406c, each of which is associated with, and controls, a component or system of the vehicle (e.g., steering, engine control, etc.). The ECUs 406a-406c can control the vehicle system with which they are associated based on data from corresponding sensors 408a, 408b, and 408c. That is, for example, the ECU associated with a steering system can control steering based on sensor data characterizing the rotation of a steering wheel. The ECUs 406a-406c can also control the vehicle system with which they are associated based on instructions or communications from other ECUs. That is, for example, the ECU associated with engine control can adjust engine parameters based on communication from the ECU associated with acceleration (which conveys data regarding the extent to which the acceleration pedal is depressed). The ECUs can communicate with each other through a shared bus, such as a CAN bus 402.

The AVI control system facilitates autonomously controlling the vehicle by controlling the various systems of the vehicle. That is, the AVI control system can enable autonomous control by controlling the ECU associated with steering, the ECU associated with engine control, the ECU associated with acceleration, etc. As described herein, the AVI control system effectuates control over the various ECUs by generating synthesized data that is used by those systems in place of ordinary data (e.g., data from a sensor or data from another ECU). The synthesized data can be generated, for example, by an AVI 404 that is also coupled to the CAN bus 402.

In some embodiments, the system can generate synthesized data in the form of synthesized sensor data. For example, sensor interposers 410a and 410c can be coupled "in between" ECUs 406a and 406c, respectively, and the corresponding sensors 408a and 408c, respectively, that ordinarily drive those ECUs. The sensor interposers 410a and 410c can drive synthesized sensor signals to the corresponding ECUs 406a and 406c, respectively, which can be based on a combination of the signals generated by the sensors 408a and 408c and information regarding the desired synthesized signal. The ECUs 406a and 406c, upstream of the sensor interposers 410a and 410c, respectively, then consume the synthesized sensor signals to, for example, control the corresponding vehicle system or to generate CAN data to be transmitted to other ECUs in the vehicle. When no synthesized sensor signals are to be generated by the system (e.g., the corresponding vehicle system is to operate without control influence from the AVI control system), the sensor interposers 410a and 410c operate to allow the unmodified signals from sensors 408a and 408c to drive the ECUs 406a and 406c.

In some embodiments, the system can generate synthesized data in the form of synthesized ECU data. For example, ECU interposer 412 can be coupled "in between" ECU 406b and the CAN bus 402. The ECU 406b can generate ordinary data based on information from the sensor 408b, but as described herein, the output of the ECU 406b can be modified by the ECU interposer 412 before controlling the corresponding vehicle system and/or communicating with other systems. For example, the ECU 406b can generate a CAN frame with data field based on the information from the sensor 408b. The ECU interposer 412, however, can overwrite the data field contents of the CAN frame before the data field is transmitted and consumed. When no synthesized ECU data is to be generated by the system, the ECU interposer 412 operates to allow the unmodified data from the ECU 406b to pass though (e.g., "as is") and drive other systems in the vehicle.

Sensor interposers 410a and 410c, and ECU interposer 412, can be controlled by the AVI 404. For example, the AVI 404 can control whether interposers should generate synthesized data (or in the alternative, allow the corresponding system to behave without influence from the interposer), and if so, the contents of the synthesized data. That is, the AVI 404 can trigger the generation of synthesized data to a steering control system to cause a vehicle to turn by certain amounts regardless of the state of the steering wheel. Similarly, the AVI 404 can trigger the generation of synthesized data to an acceleration system to cause a vehicle to accelerate by specified amounts regardless of the state of the accelerator pedal. The AVI 404 can communicate with the interposers over control channels 414a, 414b, and 414c, each of which link to an interposer. The control channels 414a-414c can be a physical point-to-point connection between the AVI 404 and interposers (e.g., a wired connection), a bus shared between the AVI and all of the interposers, a wireless connection between the AVI and interposers, and/or other suitable arrangements.

The system can also "fail operationally," whereby the vehicle systems revert to a default operational state if components of the system (e.g., the AVI 404, the interposers, the control channels 414a-414c, and/or other elements) should fail. That is, if the AVI 404 or interposer that is controlling a system of the vehicle were to stop functioning or lose power, the AVI control system can provide that the impacted vehicle system be controlled by other vehicle components, e.g., the sensors or ECUs that would ordinarily control the system, absent the AVI control system. Operational failover is provided by failover switches 416a, 416b, and 416c, each of which is coupled to restore operational functionality in case of a failure. For example, failover switch 416a can be coupled "in between" ECU 406a and sensor interposer 410a. In the case of a failure whereby the sensor interposer 410a no longer generates valid data, the failover switch 416a can switch to drive the ECU 406a with the output of sensor 408a, thereby bridging the sensor to the ECU around the source of invalid data. As a further example, failover switch 416b can be coupled "in between" the CAN bus 402 and ECU interposer 412. In the case of a failure whereby the ECU interposer 412 no longer generates valid data, the failover switch 416b can switch to drive the CAN bus 402 with the output of ECU 406b, thereby bridging the ECU to the CAN bus around the source of invalid data. The failover switches 416a-416c can switch to the failover operational state when, for example, the switches detect a loss of power in the interposers or the AVI 404, or upon detecting an error condition in the interposers or the AVI. The failover switches 416a-416c can be high-speed switches such that, for example, the switches can enter the failover operational state without downstream components detecting a discontinuity in communication with the failing components. The failover switches 416a-416c can also be coupled to redundant power supplies (not shown), that enable the AVI control system to fail operationally even when the system is losing power.

Figures 5A, 5B:
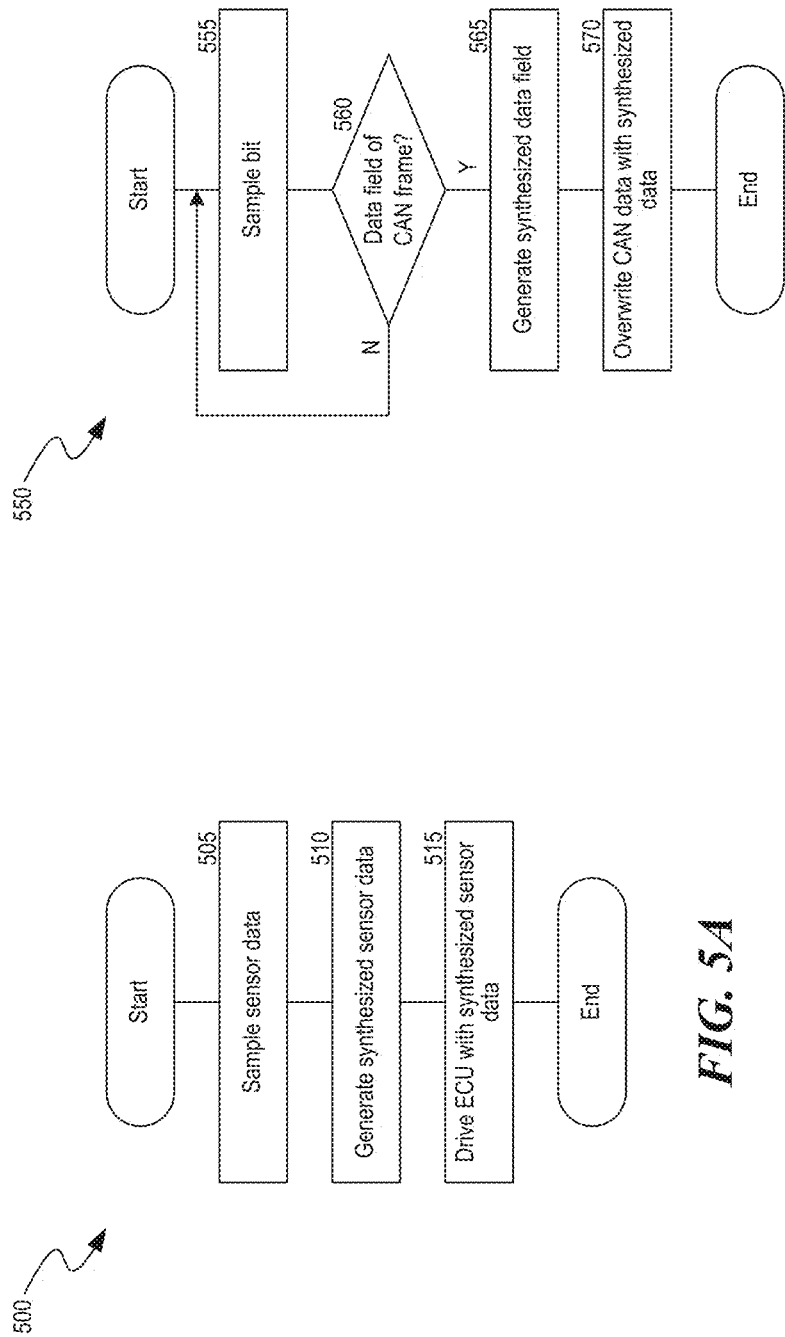
FIGS. 5A-5B are flow charts of processes implemented by an AVI control system for controlling ECUs, in accordance with representative embodiments of the present technology.

FIG. 5A is a flow chart of a representative process 500, implemented by the AVI control system, for controlling ECUs by interposing sensor data.

The process begins at a block 505, where the system samples data from the sensor associated with an ECU to be controlled. At a block 510, the system generates synthesized sensor data for the ECU to be controlled. The synthesized sensor data can be generated based on downstream user control, based on control from an AVI, based on the sampled sensor data, and/or based on other suitable input sources. At a block 515, the system drives the ECU to be controlled with the synthesized sensor data. The process 500 then ends.

FIG. 5B is a flow chart of a representative process 550, implemented by the AVI control system, for controlling ECUs by interposing ECU data.

The process begins at a block 555, where the system samples data of a CAN frame being transmitted by the ECU to be controlled. At a decision block 560, the system determines whether the sampled CAN frame data is from the data field (i.e., the payload) of the CAN frame. If the system determines that the sampled data is not from the data field, then the process 550 returns to the block 555 to sample the next data portion of the CAN frame. If the system determines that the sampled data is from the data field, then the process continues to a block 565.

At the block 565, the system generates synthesized data for the ECU. The synthesized ECU data can be generated based on downstream user control, based on control from an AVI, based on the sampled data field of the CAN frame, etc.

At a block 570, the system overwrites the data field of the CAN frame being transmitted by the ECU with the synthesized ECU data. The process 550 then ends.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and/or any variant thereof, means any connection or coupling, either direct or indirect, between two or more elements; the coupling and/or connection between the elements can be physical, logical, and/or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, and/or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, and/or blocks may be implemented in a variety of different ways. Also, while processes and/or blocks are at times shown as being performed in series, these processes or blocks may instead be performed in parallel, and/or may be performed at different times. Further, any specific numbers noted herein are only examples: alternative implementations may employ differing values and/or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and systems provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. To the extent any materials incorporated herein by reference conflict with the present disclosure, the present disclosure controls. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the technology can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms.

The invention claimed is:

1. A method, performed by an autonomous vehicle interface, to identify electronic control units in a vehicle, the method comprising:
sampling data from a data frame transmitted over a shared data bus in the vehicle, wherein multiple electronic control units are coupled to the shared bus;
determining whether the sampled data of the data fame is from a data field in the data frame; and, measuring the impedance of the shared bus when it is determined that the sampled data is from the data field of the data frame.

2. The method of claim 1, further comprising storing the measured impedance in a system memory.

3. The method of claim 1, wherein determining whether the sampled data of the data fame is from a data field in the data frame comprises determining whether the sampled data is from a data payload transmitted by an electronic control unit.

4. The method of claim 3, further comprising, when it is determined that the sampled data is not from a data payload transmitted by an electronic control unit, sampling the next data frame transmitted over the shared bus.

5. The method of claim 2, further comprising receiving a plurality of data payloads from the multiple electronic control units, and associating the data payloads with the stored, measured impedances.

6. A system for identifying electronic control units in a vehicle, the system comprising:

a plurality of electronic control units, a shared communication bus, wherein the plurality of electronic control units are configured to transmit data frame over the shared communication bus, and an autonomous vehicle interface configured coupled to the shared communication bus, wherein the autonomous vehicle interface is configured to:

sample data from a data frame transmitted over the shared communication bus in the vehicle, determine whether the sampled data of the data fame is from a data field in the data frame; and, measure the impedance of the shared bus when it is determined that the sampled data is from the data field of the data frame.

7. The system of claim 6, wherein the autonomous vehicle interface comprises an analog-to-digital converter and a memory.

* * * * *